United States Patent [19]

Mooney, Jr. et al.

[11] 4,377,811

[45] Mar. 22, 1983

[54] MEDIUM PRF PULSE DOPPLER RADAR HAVING SIMPLIFIED GROUND MOVING TARGET REJECTION CAPABILITIES

[75] Inventors: David H. Mooney, Jr., Arnold; Keith A. Harriger, Ellicott City, both of Md.

[73] Assignee: Westinghouse Electric Corp., Pittsburgh, Pa.

[21] Appl. No.: 223,177

[22] Filed: Jan. 7, 1981

[51] Int. Cl.³ .............................................. G01S 13/04
[52] U.S. Cl. ................................ 343/7 A; 343/5 CF; 343/5 SM; 343/5 DP; 343/5 FT; 343/17.1 PF
[58] Field of Search .............. 343/5 CF, 5 SM, 5 DP, 343/5 FT, 7 A, 17.1 PF

[56] References Cited

U.S. PATENT DOCUMENTS

| | | | |
|---|---|---|---|
| 3,860,924 | 1/1975 | Evans | 343/5 DP X |
| 4,058,809 | 11/1977 | Chudleigh, Jr. | 343/7 A |
| 4,093,948 | 6/1978 | Long | 343/7 A |
| 4,095,222 | 6/1978 | Mooney, Jr. | 343/5 SM |
| 4,293,856 | 10/1981 | Chressanthis et al. | 343/5 DP X |

Primary Examiner—Malcolm F. Hubler
Attorney, Agent, or Firm—H. W. Patterson

[57] ABSTRACT

In a single channel medium PRF pulse doppler radar receiver, the return signal data is processed to prevent sidelobe return signals from being displayed and rejects ground moving targets up to approximately 80 knots while having no high velocity blind speeds. After the returns are filtered by a doppler filter notch for rejecting returns having a velocity substantially less than the 80 knot example, the return data undergoes three stages of correlations to reject sidelobe returns, and undergoes processing including a fourth correlation which enables the third stage of correlation to output a signal only for unambiguous ranges that contain target data in excess of the 80 knot range.

9 Claims, 3 Drawing Figures

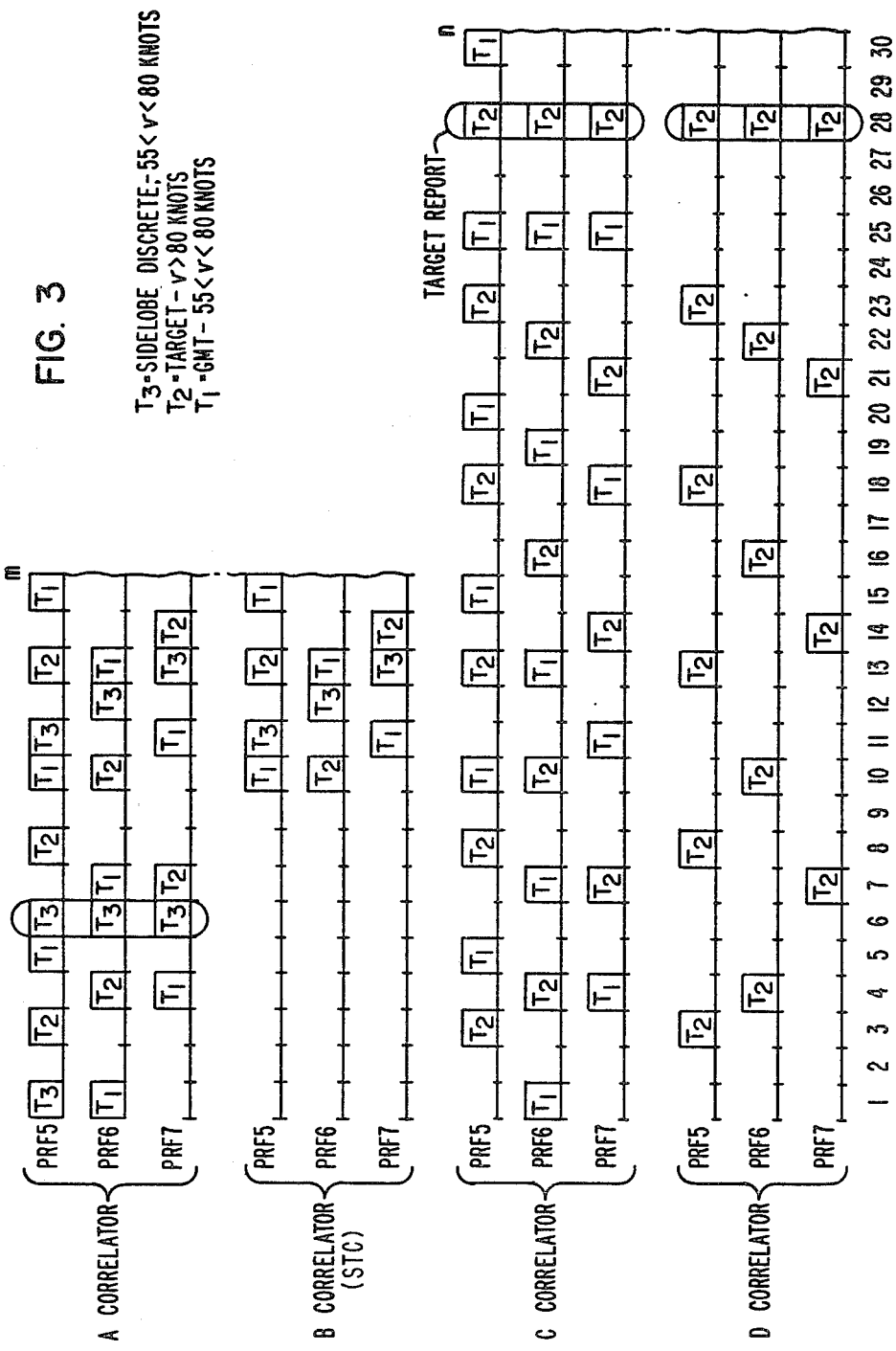

MEDIUM PRF PULSE DOPPLER RADAR HAVING SIMPLIFIED GROUND MOVING TARGET REJECTION CAPABILITIES

GOVERNMENT CONTRACT CLAUSE

The Government has rights in this invention pursuant to Contract No. F33657-75-C-0310 awarded by the Department of the Air Force.

BACKGROUND OF THE INVENTION

Heretofore, a single channel medium PRF pulse doppler radar receiver was proposed that effectively prevented sidelobe return signals from being displayed as "ghost" or "false" targets. In such system, the received signal data is preliminarily processed by a filter bank and a CFAR threshold circuit to remove main-beam clutter and area sidelobe clutter returns. The preliminarily processed data is then temporarily stored as two parallel correlations are performed on a range cell by range cell basis to identify range cells which contain discrete sidelobe clutter return signals. One of the parallel correlations is performed on the data after it is passed through a sensitivity time control threshold circuit, and the other parallel correlation is performed on the raw data. The outputs of the parallel correlators are then compared. The identified range cell correlations in the raw data correlator are compared with corresponding range cells of the sensitivity time control correlations to identify range cell numbers which contain discrete sidelobe clutter return signals. Identified range cell numbers are then blanked from the raw data before it is correlated for a third time. The output of the third correlator identifies the true target return signals and the corresponding unambiguous range thereof.

Although such a system, which is described in detail in U.S. Pat. No. 4,095,222 entitled "Post-Detection STC In A Medium PRF Pulse Doppler Radar" issued June 13, 1978 operates effectively and satisfactorily, certain ground targets that are moving at high speed may represent a predominant source of false alarms, particularly where there are a relatively large number of such ground targets compared to airborne targets of interest.

One possible approach to reducing detection of ground moving targets is to widen the main-beam clutter notch by blanking additional fast fourier transform (FFT) filters; or in other words, by rejecting them on a doppler basis. Although such an approach would be adequate to reject high speed ground moving targets in high PRF radars, it has a substantial impact on the radar detection performance against higher speed desirable targets because doppler is ambiguous in a medium PRF mode. While multiple PRF's can reduce the blind speeds, they cannot be completely avoided when using wide main-beam clutter notches. In other words, in a medium PRF radar, if the notch is widened enough to reject all ground moving targets such as up to 80 knots, for example, blind speeds may occur at high velocities due to PRF ambiguities. For example, the wider the main-beam clutter filter notch, the fewer the number of PRF's out of a total of eight, for example, will a given target be visible. With a wider notch there will be some velocities where fewer than the three PRF's, for example which are required for a detection, are visible.

Referring to FIG. 1A, the continuous curve referred to as x represents the number of visible PRF's for an 80 knot doppler notch filter, from less than five through forty kilohertz doppler frequency. Assuming that a minimum of three PRF's is required to effectively correlate a target traveling at 80 knots or above, blind speeds will occur at 12.3 khz, 13.5 khz and 29 khz. In contrast, FIG. 1B illustrates visible PRF's for a doppler notch filter that rejects ground moving targets of approximately 55 knots or less. It is readily seen from curve Z that the minimum of three PRF's, for example, of all of the PRF's are visible for such a 55 knot doppler notch filter. Thus, all low speed targets are rejected while no high speed targets are rejected, due to blind speeds.

Therefore, it is desirable to provide a method and system that substantially reduces the high speed ground moving target detection problems while at the same time improving the high velocity visibility without blind speeds.

Now in order to detect all targets exceeding 80 knots, for example, as encompassed by this invention, there must be at least one PRF with an ambiguous velocity outside the 55–80 knot region. Referring to FIG. 1C and comparing with FIG. 1B, it is seen that curve y amplitude is less than curve Z at greater than 80 knots, thus satisfying the criteria.

SUMMARY OF THE INVENTION

In accordance with the present invention, a single channel medium PRF pulse doppler radar receiving system is proposed that not only effectively prevents sidelobe return signals from being displayed as "ghost" or "false" targets; but also, rejects ground moving targets up to 80 knots, for example, while having no high velocity blind speeds. Such a system and method is very cost effective in that it requires very little hardware or software to implement.

More specifically, and in carrying out the present invention, a system and method is proposed that includes both a doppler filter notch and a ground moving target velocity threshold, which are independent of each other. Particularly, subsequent to the constant false alarm rate (CFAR) thresholding, a blanking filter rejects any return signals having a doppler shift that corresponds to opening and closing targets moving up to a maximum of approximately 55 knots, then the return signal data is correlated four times. The filter containing the largest amplitude in the range cell with a CFAR detection is selected, and the amplitude and ambiguous range are used as set forth in the above-described U.S. Patent, which is incorporated by reference herein, as inputs to the first three correlations. Specifically, the first two correlations, "A" and "B" are compared to determine which range cells contain data corresponding to sidelobe clutter discretes, and rejects or blanks such raw data which causes such discrete sidelobes. The third correlation "C" does the actual target correlation over a predetermined number "q" PRF's that are used. Independently of the "A", "B", and "C" correlations, a measure of target velocity is obtained on each radar lock. This velocity is compared with a ground moving target threshold value that is higher than the blanking filter to provide either "0" or "1" bit for the range gate under comparison. Each ambiguous range cell is unfolded as in the correlation "C" and applied to the "D" correlator. The "D" correlator stores in a delay line, the bit for each of the predetermined number of PRF's for each unambiguous range cell of the current dwell. Once each look, the "0" and "1" data of the predetermined number of PRF's is examined; and if any one of the predetermined number of unambiguous range cell bit words indicates a velocity in excess of the predetermined ground moving target threshold, the "C" correlator output for that range cell is enabled, and if target presence is indicated, the information is output to the display.

BRIEF DESCRIPTION OF THE DRAWINGS

FIG. 3 is a graphic representation of the data processed by the A, B, C and D correlator and gating function of output of C and D correlators of the method and system of FIG. 2.

DESCRIPTION OF THE PREFERRED EMBODIMENT

In the system and method of the present invention, a doppler notch filter is provided that blanks doppler frequencies of predetermined closing and opening speeds having a value that would not create high velocity blind speeds, preferably, such as plus or minus 55 knots, for example. The signal data from the CFAR threshold circuit is correlated four times. The results of the first correlations "A" and "B" are compared to determine which range cells contain data corresponding to sidelobe clutter discretes. That information is used to blank the corresponding range cell of the return signal data before that return signal data is processed by a third correlator "C". In a parallel path at the output of the CFAR threshold circuit, filter numbers are scaled via a ROM "look-up" table function, for example, to provide a digital number that corresponds to the ambiguous velocity of the return signal data. The ambiguous velocity data that is greater than a predetermined number of knots is a candidate desired target that would be above the speed of a ground moving target. The ambiguous range cells for targets in excess of such moving ground target velocity is unfolded and applied to the fourth or "D" correlator. The correlation from the "D" correlator for each range cell is compared with the output of the "C" correlator to indicate the presence of desired targets.

Figure 1:
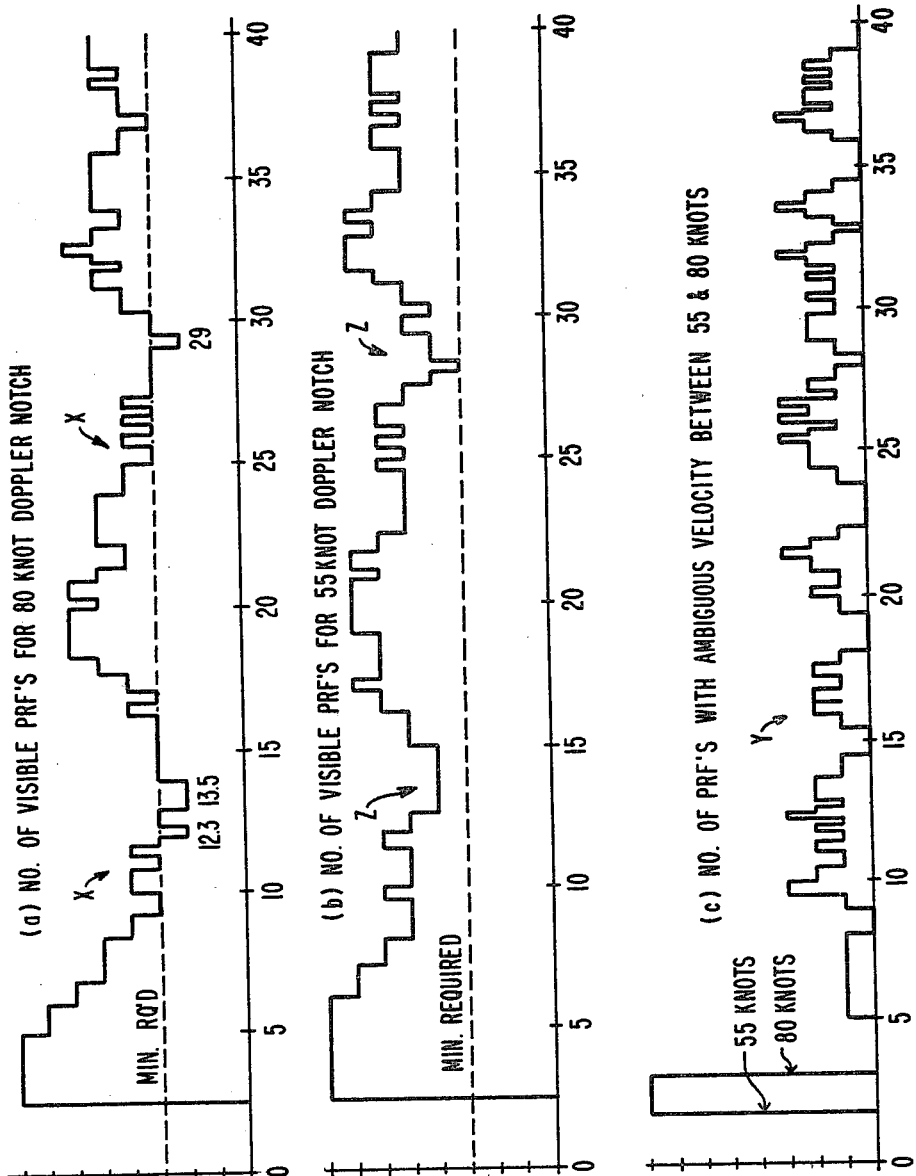
FIGS. 1A, 1B and 1C is a graphical representation to illustrate the number of visible pulse repetition frequencies for two different doppler notch filters and the difference thereof.
Figure 2:
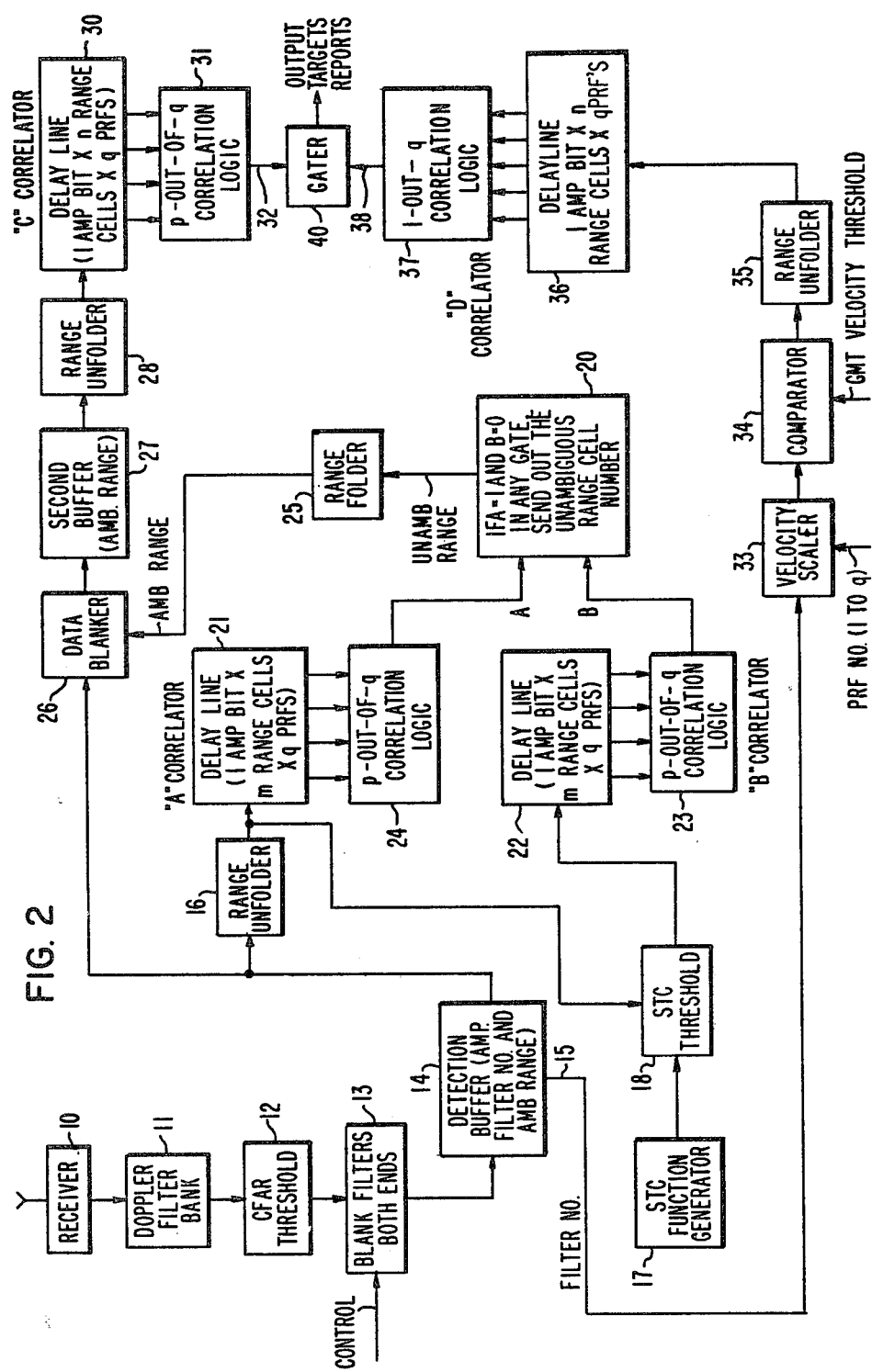
FIG. 2 is a block diagram of the method and system of the present invention.

Referring to FIG. 2, signals of a coherent radar receiver 10 of a single channel medium PRF pulse doppler-type radar system are applied to a doppler filter bank 11 which separates signals having different doppler shift and provides the means to remove main beam clutter signals from the target signals. A CFAR threshold circuit 12, which is responsive to the doppler filter bank 11, provides a constant false alarm rate threshold signal which is responsive to the level of intensity of the area sidelobe clutter. The constant false alarm rate thresholds, serves to eliminate the area sidelobe clutter returns included in the received signal. Digital information from the CFAR circuit of the receiver is applied to circuit 13, which may be a conventional logic design that functions to reject any return signals having doppler shifts that correspond to closing and opening targets traveling at a maximum of 55 knots, for example. It has been determined that a filter blanking process that blanks ground moving targets that open and close at velocities greater than 55 knots causes blind speeds; however, the circuit 13 may be controlled in any conventional manner such as by software, for example, to adjust the notch width of the filter bank to reject or blank ground moving targets traveling at less than 55 knots, in accordance with the particular application. The digital information from the filter blanking 13 is received in a detection buffer 14 which temporarily stores and indicates the amplitude and filter number of the received signal that exceeds the CFAR threshold, for each ambiguous range cell for each PRF of the radar dwell time. Such buffer 14 outputs also on line 15 a stored filter number that corresponds to such amplitude selected signal. A range unfolder 16 which is a conventional digital logic design circuit that may consist in part of a random access memory and a modulo counter wherein the random access memory has at least as many addresses as the number of ambiguous range cells of the lowest PRF. When an ambiguous target detect signal is in the random access memory portion of the unfolder 16, the modulo range counter portion thereof accesses the number of addresses in the memory corresponding to the number of range cells in the ambiguous PRF signal. These addresses are accessed in repeated succession to unfold the ambiguous target detect signal over a predetermined range. In other words, the ambiguous PRF signals are duplicated a sufficient number of times that the chain of PRF signal duplication extends over the predetermined range. Therefore, the unambiguous range determines the number of times the addresses of the random access memory of the range unfolder 16 are accessed for a particular ambiguous detect signal. The length of the predetermined range which is the sensitivity time control (STC) range is established by the range at which the amplitude of the discrete sidelobe clutter returns are statistically predicted to fall below the detection threshold level of the CFAR threshold circuit 12. Therefore, discrete sidelobe clutter return signals and true target return signals are output from the range unfolder 16 and assigned unambiguous range cells with amplitude designation. The output of the range unfolders 16 is fed in parallel to "A" and "B" correlators which, together with the unfolder 16, STC function generator 17, STC threshold comparator 18, and comparator 20, comprise means for detecting the occurrence of discrete sidelobe clutter returns in the STC range of the range unfolder 16. The "A" correlator directly receives the signal detection information from the range unfolder 16 which is input to delay line 21. The delay line 21 is comprised of a memory with an address for each unambiguous STC range cell; and has a dimensional capacity of one amplitude bit by "m" range cells by "q" PRF's. One amplitude bit indicates the state of the signal fed into the delay line 21 wherein "0" indicates no detection and a "1" indicates a signal detection. The number of range cells m in the delay line 21 corresponds to the number of range cells within the maximum range of the STC threshold function employed in the "B" correlator. The q PRF's may be three or more and are typically six to eight in number. The data output from the range unfolder 16 is also fed to the STC threshold circuit 18 that is controlled by the STC function generator 17. The STC threshold circuit 18 compares the unfolded, unambiguous range signal of each PRF from the unfolder 16 with the STC level which follows an $R^{-4}$ power curve to determine whether a signal occurring in a particular range cell of the unfolded range signal represents a discrete sidelobe clutter return. The data exceeding the STC threshold is passed to delay line 22 of the "B"

correlator. Reference is made to U.S. Pat. No. 4,095,222 for a more detailed description of the STC generator and threshold function 17 and 18 respectively.

The delay line 22 of the "B" correlator is identical to the delay line 21 of the "A" correlator. Correlation logic circuits 23 and 24 respectively correlate the data in the corresponding m range cells in the delay lines 22 and 21. The correlation logic circuits 21 and 22 each include a summing network and a comparator, such that the summing network adds the output provided by the shift register memory of the delay lines 23 and 24, respectively, for each range cell, and provides a signal representing the summation to its comparator. When its comparator determines that the signal provided by its summing network exceeds the predetermined value which would indicate correlation among the sufficient number of the unambiguous range signals in a particular range cell, the comparator determines that there is correlation between concurrently accessed addresses representing range cells in each of the unambiguous PRF range signals, and provides a correlation signal to the logic circuit 20, which signal is a "1" if there is correlation and "0" if there is not. The output of the "A" correlator is compared with the output of the "B" correlator for each of the m unambiguous range cells. The logic circuit 20, which is comprised of an inverter on the "A" input and an inverting NAND gate, produces a range cell number indication whenever the "A" correlator produces the signal of "1" and the "B" correlator produces the signal of "0" for any particular unambiguous range cell. A range folder 25 converts the true range cell number that corresponds to an identified clutter discrete, into a form suitable to control a data blanker 26. This is accomplished by a divider circuit which divides the true range cell number by the number of gates per interpulse period for each PRF, in turn, and outputs the remainder or "modulo". In other words, the range folder 25 folds the output of the logic circuit 20 into a predetermined number of range cells, in accordance with the interpulse period of the respective PRF, to provide an ambiguous PRF discrete signal to the data blanker 26. This operation is, of course, inverse to the operation of the range unfolder 16. The range folder 25 includes a random access memory and a modulo range counter for each PRF of the radar. The random access memory provides a memory address for each range cell of each unambiguous PRF discrete signal and the addresses associated with each unambiguous PRF discrete signal; and the addresses associated with each unambiguous PRF discrete signal are successively accessed by the modulo range counter associated with the corresponding unambiguous PRF range signal to store the ambiguous PRF discrete signals in the random access memory of the range folder 25.

The ambiguous range gate number from the range folder 25 is employed to blank out data received in the data blanker 26 from the detection buffer 14 in the corresponding ambiguous range cell number. A buffer 27 receives the data from the data blanker 26 for each ambiguous range cell, except those which are blanked. This information is then fed to a means for determining the range of the target from the target returns provided by the data blanker 26, which means includes the "C" correlator via a range unfolder 28, which assigns the data from the buffer 27 to unambiguous range cells for each PRF. The range unfolder 28 is similar to the range unfolder 16, and performs the same unfolding operation on the ambiguous PRF signals received from the second buffer 27 as the range unfolder 16 performs on the ambiguous PRF signals received from the detection buffer 14. The "C" correlator, which includes the delay line 30 that is comprised of a shift register memory; and a correlation logic circuit 31, that is comprised of a summing network and a comparator, has a dimension of one amplitude bit by "n" range cells by "q" PRF's. The correlation logic 31 then determines the number of occurrences "p" in corresponding range cells of the "q" PRF's. Typically, p is three and may be increased in areas of heavy discrete sidelobe clutter however, an increase in p is necessarily met with a lower degree of sensitivity to the true target, since a large number of correlations are necessary in order to indicate a true target return. The output 32 of the "C" correlator indicates the reception of true target returns that are opening or closing at a velocity in the range of 55 knots or more, depending upon the adjustment of the filter blanking 13 as previously described.

The detection buffer 14 provides data on line 15 corresponding to the filter number that represents the largest detected amplitude return signal for each range gate. Thus, the fast Fourier transform filter number having the peak amplitude is scaled to a true velocity using a read-only-memory "look up" table. The following exemplary tables which illustrate typical fast Fourier transform filter number relating eight pulse repetition frequencies for increasing and decreasing doppler frequencies respectively accounts for the differing filter bandwidths of the fast Fourier transform filters when the PRF is changed.

TABLE 1

| FFT FILTER NUMBER | VELOCITY SCALER | | | | | | | |
|---|---|---|---|---|---|---|---|---|
| | $RG_{IPP}=$ 127 | $RG_{IPP}=$ 113 | $RG_{IPP}=$ 103 | $RG_{IPP}=$ 87 | $RG_{IPP}=$ 83 | $RG_{IPP}=$ 73 | $RG_{IPP}=$ 70 | $RG_{IPP}=$ 67 |
| 32 | T | ↑ | ↑ | ↑ | ↑ | ↑ | ↑ | ↑ |
| 33 | 31 | ↑ | ↑ | ↑ | ↑ | ↑ | ↑ | ↑ |
| 34 | 30 | ↑ | ↑ | ↑ | ↑ | ↑ | ↑ | ↑ |
| 35 | 29 | ↑ | ↑ | ↑ | ↑ | ↑ | ↑ | ↑ |
| 36 | 28 | 31 | ↑ | ↑ | ↑ | ↑ | ↑ | ↑ |
| 37 | 27 | 30 | ↑ | ↑ | ↑ | ↑ | ↑ | ↑ |
| 38 | 26 | 29 | ↑ | ↑ | ↑ | ↑ | ↑ | ↑ |
| 39 | 25 | 28 | 31 | ↑ | ↑ | ↑ | ↑ | ↑ |
| 40 | 24 | 27 | 30 | ↑ | ↑ | ↑ | ↑ | ↑ |
| 41 | 23 | 26 | 28 | ↑ | ↑ | ↑ | ↑ | ↑ |
| 42 | 22 | 25 | 27 | ↑ | ↑ | ↑ | ↑ | ↑ |
| 43 | 21 | 24 | 26 | 31 | ↑ | ↑ | ↑ | ↑ |
| 44 | 20 | 22 | 25 | 29 | 31 | ↑ | ↑ | ↑ |
| 46 | 18 | 20 | 22 | 26 | 28 | 31 | ↑ | ↑ |
| 48 | 16 | 18 | 20 | 23 | 24 | 28 | 29 | 30 |
| 49 | 15 | 17 | 18 | 22 | 23 | 26 | 27 | 28 |

TABLE 1-continued

VELOCITY SCALER

| FFT FILTER NUMBER | RG_IPP = 127 | RG_IPP = 113 | RG_IPP = 103 | RG_IPP = 87 | RG_IPP = 83 | RG_IPP = 73 | RG_IPP = 70 | RG_IPP = 67 |
|---|---|---|---|---|---|---|---|---|
| 50 | 14 | 16 | 17 | 20 | 21 | 24 | 25 | 27 |
| 52 | 12 | 14 | 15 | 18 | 18 | 21 | 22 | 23 |
| 53 | 11 | 12 | 14 | 16 | 17 | 19 | 20 | 21 |
| 55 | 9 | 10 | 11 | 13 | 14 | 16 | 16 | 17 |
| 56 | 8 | 9 | 10 | 12 | 12 | 14 | 15 | 15 |
| 57 | 7 | 8 | 9 | 10 | 11 | 12 | 13 | 13 |
| 58 | 6 | 7 | 8 | 9 | 9 | 10 | 11 | 11 |
| 59 | 5 | 6 | 6 | 7 | 8 | 9 | 9 | 9 |
| 60 | 4 | 4 | 5 | 6 | 6 | 7 | 7 | 8 |
| 61 | 3 | 3 | 4 | 4 | 5 | 5 | 5 | 6 |
| 62 | 2 | 2 | 2 | 3 | 3 | 3 | 4 | 4 |
| 63 | 1 | 1 | 1 | 1 | 2 | 2 | 2 | 2 |

TABLE 2

VELOCITY SCALER

| FFT FILTER NUMBER | RG_IPP = 127 | RG_IPP = 113 | RG_IPP = 103 | RG_IPP = 87 | RG_IPP = 83 | RG_IPP = 73 | RG_IPP = 70 | RG_IPP = 67 |
|---|---|---|---|---|---|---|---|---|
| 0 | 0 | 0 | 0 | 0 | 0 | 0 | 0 | 0 |
| 1 | 1 | 1 | 1 | 1 | 2 | 2 | 2 | 2 |
| 2 | 2 | 2 | 2 | 3 | 3 | 3 | 4 | 4 |
| 3 | 3 | 3 | 4 | 4 | 5 | 5 | 5 | 6 |
| 4 | 4 | 4 | 5 | 6 | 6 | 7 | 7 | 8 |
| 6 | 6 | 7 | 8 | 9 | 9 | 10 | 11 | 11 |
| 7 | 7 | 8 | 9 | 10 | 11 | 12 | 13 | 13 |
| 8 | 8 | 9 | 10 | 12 | 12 | 14 | 15 | 15 |
| 9 | 9 | 10 | 11 | 13 | 14 | 16 | 16 | 17 |
| 10 | 10 | 11 | 12 | 15 | 15 | 17 | 18 | 19 |
| 11 | 11 | 12 | 14 | 16 | 17 | 19 | 20 | 21 |
| 12 | 12 | 14 | 15 | 18 | 18 | 21 | 22 | 23 |
| 13 | 13 | 15 | 16 | 19 | 20 | 23 | 24 | 25 |
| 15 | 15 | 17 | 18 | 22 | 23 | 26 | 27 | 28 |
| 16 | 16 | 18 | 20 | 23 | 24 | 28 | 29 | 30 |
| 17 | 17 | 19 | 21 | 25 | 26 | 30 | 31 | 31 |
| 18 | 18 | 20 | 22 | 26 | 28 | 31 | ↓ | ↓ |
| 19 | 19 | 21 | 23 | 28 | 29 | ↓ | ↓ | ↓ |
| 20 | 20 | 22 | 25 | 29 | 31 | ↓ | ↓ | ↓ |
| 21 | 21 | 24 | 26 | 31 | ↓ | ↓ | ↓ | ↓ |
| 22 | 22 | 25 | 27 | ↓ | ↓ | ↓ | ↓ | ↓ |
| 23 | 23 | 26 | 28 | ↓ | ↓ | ↓ | ↓ | ↓ |
| 24 | 24 | 27 | 30 | ↓ | ↓ | ↓ | ↓ | ↓ |
| 25 | 25 | 28 | 31 | ↓ | ↓ | ↓ | ↓ | ↓ |
| 26 | 26 | 29 | ↓ | ↓ | ↓ | ↓ | ↓ | ↓ |
| 27 | 27 | 30 | ↓ | ↓ | ↓ | ↓ | ↓ | ↓ |
| 28 | 28 | 31 | ↓ | ↓ | ↓ | ↓ | ↓ | ↓ |
| 29 | 29 | ↓ | ↓ | ↓ | ↓ | ↓ | ↓ | ↓ |
| 30 | 30 | ↓ | ↓ | ↓ | ↓ | ↓ | ↓ | ↓ |
| 31 | 31 | ↓ | ↓ | ↓ | ↓ | ↓ | ↓ | ↓ |

Table 1 lists the scaler table for one typical example. They contain 64 entries for each of the eight PRF's, in the form of a five bit word representing the scaled filter number. All PRF's are scaled to the spacing of the lowest PRF of the system, thus for example, FFT filter number 15 in the Table 1 in a PRF having 67 range gates per interpulse period (RG/IPP) represents the same speed target as one falling in a FFT filter such as number 25 at a rate of 113 range gates per IPP pulse repetition frequency. Note also that the FFT filters between 32 and 63 of Table 2 are folded back, since this is where the doppler frequency for opening targets fall, while filters 1 to 31 in the Table 1 represent doppler frequencies for closing targets. This exemplification assumes target speeds less than ½ of the pulse repetition frequency. Thus, the output of the velocity scaler 33 is a scaler number proportional to ground target velocity, independent of the pulse repetition frequency. This scaler number is compared for each radar look with a ground moving target threshold value at comparator 34. Assuming that the GMT threshold value is 80 knots, it is noted in Table 1 that 80 knots corresponds to a scaled value of filter 22 of Table 1 so the filter value 22 will fail, while a filter value of 23 or more will pass through the comparator 34 to range unfolder 35. The comparator output is a one bit word ("0" or "1") for each look, for the particular range gate being addressed. The range unfolder 35 receives the ambiguous range data from the detection buffer 14 through the velocity scaler 33 and comparator 34, and for each PRF, unfolds the data into n range cell numbers. The range unfolder 35, is comprised of a random access memory and a modulo range counter, which is a conventional digital logic design circuit, although it is apparent to those skilled in the pertinent art that other equivalent devices may also be used. The random access memory portion of the device has at least as many addresses as the number of range cells in the ambiguous received signal of the PRF having the highest number of range cells. When an ambiguous PRF signal is loaded into the random access memory portion of the device 35 from the detection buffer 14 over line 15 through the velocity scaler 33 and the comparator 34, the modulo range counter accesses the number of addresses in the random excess memory portion corresponding to the number of range cells in the ambiguous PRF signal. These addresses are accessed in repeated succession to unfold the ambiguous PRF signal that corresponds to a target velocity in excess of the ground moving target velocity threshold over a predetermined range. It is recalled that the ambiguous PRF signals, when unfolded over a range, are duplicated a sufficient number of times that the chain of PRF signal duplications will extend over the predetermined range. The "D" correlator directly receives the information from the range unfolder 35 in its delay line 36. The delay line 36, is comprised of a shift register memory with an address for each unambiguous range cell and each PRF. The delay line 36 has a dimensional capacity of one amplitude bit by n range cells by q PRF's. Correlation logic 37 then determines the number of occurrences "p" in corresponding range cells of the "q" PRF's. Typically, p is one. Thus, the one bit word for each of eight PRF's for example of the last dwell of the radar, and for each unambiguous range cell similar to correlator "C" is stored in the delay line. Once each look, the eight PRF's data is examined with a one of eight detection logic by the correlation logic 37 for example. If any one of the eight looks have a "1" on output 38, an enabling gate 40 is tripped to pass the output target reports from the output 32 of the correlation logic 31 of the "C" correlator. Therefore, if all PRF's show it to be less than the GMT velocity threshold of 80 knots for example, the output from the logic circuit 31 is blanked and there is no output target report for that particular range. It is the difference in logic between the "C" and "D" correlators that permits medium speed ground targets between 55 and 80 knots in the present example, to be rejected, while not causing high velocity blind speeds.

In describing the operation of the present invention, reference is made to FIG. 3 which indicates the presence of three return signals, $T_1$, $T_2$, and $T_3$. For illustration purposes, the number of range cells "m" for the A and B correlators equals 15, and the number of range cells "n" for the C and D correlators equals 30. The number of occurrences "p" in corresponding range cells of the total number "q" of the PRF's is 3. In actual practice, it is understood that "p", "q", "m" and "n", are substantially greater. Also, the number of occurrences "p" in order to obtain a correlation may be adjusted in accordance with the particular areas and conditions in which the system is utilized.

For illustration, $PRF_5$, $PRF_6$ and $PRF_7$ are indicated to have range cells of 5, 6 and 7 for their respective interpulse periods.

While not shown in the illustration, in actual practice the first range gate time slot is normally reserved for the transmit pulse, since it is undesirable to receive while transmitting. This does not affect the explanation, however.

As shown in FIG. 3, in $PRF_5$, return signal $T_1$ occurs in range cells 5, 10, 15, 20, 25, and 30; while return signal $T_2$ occurs in range cells 3, 8, 13, 18, 23, and 28; and return signal $T_3$ for $PRF_5$ (A correlator) occurs in range cells 6, and 11.

In $PRF_6$, return signals $T_1$ occur in range cells 1, 7, 13, 19, and 25; while return signals $T_2$ occur in range cells 4, 10, 16, 22, and 28; and return signals $T_3$ occur in range cells 6 and 12.

In PRF 7, return signals $T_1$ occur in range cells 4, 11, 18, and 25; while return signals $T_2$ occur in range cells 7, 14, 21, and 28.

On a range cell by range cell basis, the A correlator indicates an output of 1 in range cells 6 and 13; while the B correlator produces a "0" output in range cell 6. The B correlator produces an output signal in range cell 13 only. Since A correlator produces a "1" in range cell 6 and 13 and B correlator produces a "0" in range cell 6, the logic circuit 20 indicates that range cell 6 contains sidelobe discrete return signals and should be blanked in the incoming data to the C correlator. The information indicating range cell number 6 is fed to the range folder 25. The range folder circuit 25 provides ambiguous range gates for each of the PRF's, wherein ambiguous range cell 6 is designated to be blanked. The unambiguous range cell 13 which contained a correlated ghost signal is also blanked by the above operations. By blanking the ambiguous range cell 6 in the data blanker 26, the unambiguous range cell 13 does not produce a correlation in the C correlator since it corresponds to ambiguous range cell 6 in $PRF_7$. Extended over the reception range of the system, correlation will not occur in the C correlator in unambiguous range cells 6, 13, or 18. Thus, a return signal $T_3$ does not contribute to the output of the system which indicates that it is an undesirable signal such as sidelobe discrete, or a ground moving target of less than the predetermined number of knots set by the blanking filter 13.

Return signals $T_1$ and $T_2$ as seen from FIG. 3 produce a correlation in C correlator at range cells 25 and 28, respectively, which indicates that the return signals $T_1$ and $T_2$ at this point in the system are true targets having an ambiguous velocity above the predetermined maximum filter notch of 55 knots, for example.

The information fed to the D correlator is a filter number from the detection buffer 14 as previously described that is fed to the velocity scaler 33 to provide a digital output for each of the PRF numbers ($PRF_5$, $PRF_6$, and $PRF_7$) which are compared in the circuit 34 to provide an output for the different PRF's for only those targets having a velocity above the predetermined threshold such as 80 knots, for example. The output of the comparator 34 is then fed to the range unfolder 35 which is similar to the range unfolders 25 and 28 to the delay line 36 of the D correlator. In FIG. 3, it is seen that the only return signal that is correlated corresponds to the target $T_2$. Thus, a return signal is indicated for $PRF_5$ in range cells 3, 8, 13, 18, 23 and 28; and for $PRF_6$ in range cells 4, 10, 16, 22, and 28; and for $PRF_7$ in range cells 7, 14, 21, and 28. Since the C correlator indicates a P out of Q correlation in the range cell 28 and the D correlator has at least one PRF with an output in range cell 28, then the gater 40 provides an output indicating a high velocity target at range cell 28. It is noted that the C correlator indicates a correlation for the return signal $T_1$ in range cell 25, but the D correlator has no output for the corresponding range cell. Thus, there is no output for the target $T_1$ indicating that it does not exceed the minimum threshold necessary for a high velocity target.

What we claim is:

1. In a single channel radar receiver responsive to return signals that include discrete sidelobe clutter returns and returns representative of targets having velocities both greater than and less than a predetermined first threshold velocity, and having means for correlating the returns to provide a first correlation signal and means for thresholding the returns over a predetermined period of time and correlating such thresholded return to provide a second correlation signal and having means including the first and second correlation signals to detect and blank the discrete sidelobe returns, and having means to correlate the blanked returns over a predetermined number of range cells to provide a third correlation signal indicative of the unambiguous range of any target return signals, the improvement of:

a doppler notch filter operatively connected to blank return signals corresponding to target velocities below a predetermined second threshold velocity that is less than the first threshold velocity, means governed by the outputs of the notch filter to indicate a fast fourier transform filter number for each range gate interpulse period to generate a true velocity signal independent of pulse repetition frequency, means to compare the filter number during each radar look with a data value corresponding to the first threshold velocity, and means responsive to said comparison means and the third correlation signal to provide an output signal for each range gate indicative of the unambiguous range of only those target return signals above the first threshold velocity value.

2. In a system according to claim 1 wherein the first threshold velocity is approximately eighty knots.

3. In a system according to claim 1 or 2 wherein the second threshold velocity is approximately fifty-five knots.

4. A method of processing return signal data in a medium PRF radar receiver to distinguish target return signals corresponding to targets having a velocity in excess of a predetermined velocity from targets having a velocity less than said predetermined velocity, and sidelobe return signals, over multiple transmitted PRF's, wherein the return signal data is correlated and thresholded over a first predetermined number of unambiguous range cells for each PRF to generate respective first and second signals indicative of a second predetermined number of range cells being occupied by the return signal data and thresholded return signal data, and wherein range cell numbers are blanked in the return signal data for each PRF to remove sidelobe return signals present in the return signal data, and wherein the blanked return signal data is correlated over a third predetermined number of unambiguous range cells for each PRF to produce a third signal indicative of true target return signals present in said return data, comprising the steps of:

filtering return signals to blank data corresponding to returns indicating a doppler shift less than a first predetermined velocity threshold, generating true velocity data independent of pulse repetition frequency for returns indicating a doppler shift greater than the first predetermined velocity threshold, comparing the true velocity data for each range with a second velocity threshold corresponding to a velocity higher than the first velocity threshold, generating output signal data for each true velocity data in each range cell, comparing the correlated true target return signals for each range cell with the true velocity data, and utilizing only the third correlation signals at times when the true velocity data indicates the velocity being above the second velocity threshold for a respective range.

5. A method according to claim 4 wherein the first velocity threshold is approximately 55 knots.

6. A method according to claim 4 or 5 wherein the second velocity threshold is approximately 80 knots.

7. A method of processing return signal data in a medium PRF radar receiver to distinguish main beam true target return signals representative of targets having a first predetermined threshold velocity from sidelobe return signals and true target return signals representative of targets having a second threshold velocity less than the first threshold velocity over multiple transmitted PRF's, comprising the steps of:

filtering the return signals to blank returns having a doppler shift representative of returns with a velocity less than said second threshold velocity, detecting the filtered returns, generating data in response to the detected returns to indicate a filter number for each range gate interpulse period for generating a true velocity signal data independent of PRF, comparing the true velocity signal data with data corresponding to the first threshold velocity to generate an output when said data exceeds said first threshold velocity, unfolding the output of said comparing means over a predetermined range, correlating the unfolded data from said comparing means to determine a first predetermined number of occurrences of data in corresponding unambiguous range cells of said multiple PRF's, processing the detected filter return independent of the preceding steps to distinguish main beam true target return signals representative of targets having a velocity at least equal to the second threshold velocity from sidelobe return signals, said processing step including unfolding and correlating return signal data over a number of unambiguous range cells for each PRF to determine a second predetermined number of occurrences of data in corresponding unambiguous range cells of said multiple PRF's, and generating an output signal for each unambiguous range cell that includes the first and second predetermined number of occurrences.

8. A method according to claim 7 wherein the second threshold velocity is approximately 55 knots.

9. A method according to claim 7 or 8 wherein the first threshold velocity is approximately 80 knots.

* * * * *